(12) United States Patent
Connor (10) Patent No.: US 7,149,512 B2
(45) Date of Patent: Dec. 12, 2006

(54) APPARATUS AND METHOD TO AUTOMATICALLY ADJUST VOLUME OR CONTROL OPERATION OF AN APPLIANCE

(75) Inventor: Patrick L. Connor, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 445 days.

(21) Appl. No.: 10/183,124

(22) Filed: Jun. 25, 2002

(65) Prior Publication Data

US 2004/0203353 A1    Oct. 14, 2004

(51) Int. Cl.
*H04M 3/00* (2006.01)
(52) U.S. Cl. .................... 455/420; 455/41.2; 455/567
(58) Field of Classification Search ............. 455/41.1, 455/63.1, 95, 420, 461, 550.1, 567, 570, 455/41.2, 418, 419
See application file for complete search history.

(56) References Cited

U.S. PATENT DOCUMENTS

| | | | | |
|---|---|---|---|---|
| 4,873,712 A | * | 10/1989 | Porco | 455/572 |
| 5,128,987 A | * | 7/1992 | McDonough et al. | 379/102.03 |
| 5,479,476 A | * | 12/1995 | Finke-Anlauff | 455/566 |
| 5,542,102 A | * | 7/1996 | Smith et al. | 455/462 |
| 5,870,453 A | * | 2/1999 | Shapiro | 379/38 |
| 5,870,684 A | * | 2/1999 | Hoashi et al. | 455/567 |
| 5,903,819 A | * | 5/1999 | Romesburg | 455/63.1 |
| 5,903,853 A | * | 5/1999 | Sano | 455/570 |
| 5,963,624 A | * | 10/1999 | Pope | 379/110.01 |
| 5,987,106 A | * | 11/1999 | Kitamura | 379/110.01 |
| 6,006,114 A | * | 12/1999 | Seppanen et al. | 455/567 |
| 6,061,435 A | * | 5/2000 | Grundvig et al. | 379/102.03 |
| 6,150,928 A | * | 11/2000 | Murray | 340/426.14 |
| 6,272,680 B1 | * | 8/2001 | Gaughan et al. | 725/112 |
| 6,285,891 B1 | * | 9/2001 | Hoshino | 455/567 |
| 6,510,210 B1 | * | 1/2003 | Baughan | 379/90.01 |
| 6,628,964 B1 | * | 9/2003 | Bates et al. | 455/556.1 |
| 6,690,778 B1 | * | 2/2004 | Kahn | 379/110.01 |
| 6,845,151 B1 | * | 1/2005 | Peng | 379/142.06 |
| 6,993,349 B1 | * | 1/2006 | Martinez et al. | 455/456.4 |
| 2002/0031086 A1 | * | 3/2002 | Welin | 370/229 |
| 2002/0044199 A1 | * | 4/2002 | Barzebar et al. | 348/14.01 |
| 2002/0180581 A1 | * | 12/2002 | Kamiwada et al. | 340/5.2 |
| 2003/0013495 A1 | * | 1/2003 | Oleksy | 455/567 |
| 2003/0165129 A1 | * | 9/2003 | Sharma et al. | 370/338 |
| 2004/0023673 A1 | * | 2/2004 | Dafcik | 455/462 |

* cited by examiner

*Primary Examiner*—William Trost
*Assistant Examiner*—James D. Ewart
(74) *Attorney, Agent, or Firm*—Schwegman, Lundberg, Woessner & Kluth, P.A.

(57) ABSTRACT

An apparatus includes a device adapted to detect one of receiving an incoming call or initiating an outgoing call. A transmitter is adapted to send a request signal in response to receiving the incoming call or initiating the outgoing call. The request signal may be used to adjust a volume setting or pause operation of an appliance.

24 Claims, 7 Drawing Sheets

APPARATUS AND METHOD TO AUTOMATICALLY ADJUST VOLUME OR CONTROL OPERATION OF AN APPLIANCE

FIELD OF THE INVENTION

The present invention relates generally to communications, such as wireless communications devices and the like, and more particularly to an apparatus and method to adjust volume or pause operation of an appliance, such as a television, digital video disc (DVD) player, video cassette recorder (VCR), personal video recorder (PVR), stereo, personal computer or the like when a telephone call is received or initiated.

BACKGROUND INFORMATION

With the advent of wireless, portable communication devices, such as cellular telephones, cordless phones and the like, a telephone call can be received or made just about any place at any time. Calls may sometimes be received or made in environments that are noisy making it difficult to carry on a conversation, such as an environment with a compact disc (CD) player, tape player, television, stereo or other appliance playing or operating and creating distracting noise in the background. When a call is incoming and the volume of an appliance needs to be adjusted or the operation paused, there can be a frantic search for a remote control or dash to the appliance to mute or adjust the volume or pause operation while the call is in progress or at least while the call is initially answered and the person receiving the call can relocate to another room or area. A loud sound from an appliance may also be frustrating to a caller and embarrassing for the called person when the called person has to excuse himself while he searches for a remote to adjust the volume or moves to a quieter location. The volume of the appliance can also be so loud that the alerting tones from the phone cannot be heard resulting in calls being missed.

Missing a portion of a movie and having to rewind a tape or backup a DVD player can also be frustrating after receiving an unwanted telephone call, such as a call from a telemarketer.

Wireless, portable communication devices, such as cellular telephones, pagers and the like, can also be the creators of unwanted noise or signals in some environments. Facilities or environments where alerting signals from communication devices may be unwanted include quiet zones such as in hospitals, libraries, theaters or the like, and environments where radio signals from such communication devices can disrupt the operation of equipment or devices include for example hospitals, airplanes, construction areas where radio signals may be used to detonate explosives and the like.

DESCRIPTION OF THE PREFERRED EMBODIMENTS

The following detailed description of preferred embodiments refers to the accompanying drawings which illustrate specific embodiments of the invention. Other embodiments having different structures and operations do not depart from the scope of the present invention.

Figure 1:
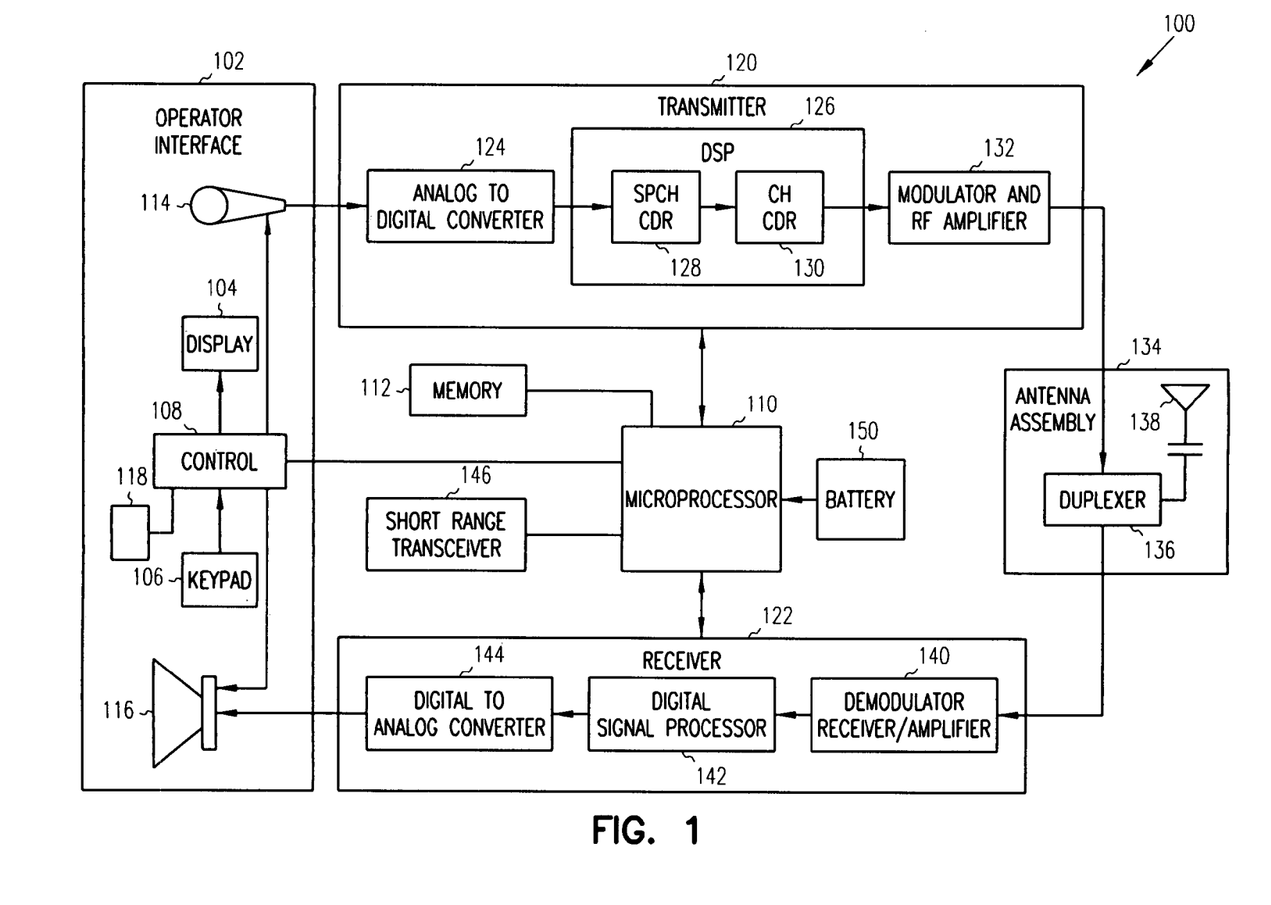
FIG. 1 is a block diagram of communication device in accordance with an embodiment of the present invention.

FIG. 1 is a block diagram of an example of a communication device 100, such as a radio telephone, cordless telephone, cellular telephone, pager or the like in accordance with an embodiment of the present invention. The communication device 100 shown can transmit and receive digital signals; although, the communication device 100 may also be an analog telephone or a dual mode or multi-mode telephone capable of transmitting and receiving both analog and digital signals. Only the digital transmit and receive paths are shown in FIG. 1 for purposes of clarity and because most wireless telephones sold today have at least digital capabilities. The communication device 100 may include an operator interface 102 including a display 104 to provide visual signals to the subscriber or user as to the status of the communication device 100 and the communication device 100 may include a keypad 106 that permits the subscriber to communicate commands to the communication device 100 and control operation of the communication device 100. A control unit 108 may be provided in the operator interface 102 to control operation of the display 104 and the keypad 106. The control unit 108 may be coupled to a microprocessor 110, another control unit or the like, that manages overall operation of the communication device 100 under stored program control using software programs that may be stored in a memory 112. The microprocessor 110 encodes and decodes control signals and performs call processing procedures. The operator interface 102 may also contain a microphone 114 and a speaker 116. The microphone 114 and the speaker 116 may be coupled to the control unit 108 and through the control unit 108 may be coupled to the microprocessor 110 to control their operation, such as the volume of the speaker 116, gain of the microphone 114 and the like. The microphone 114 receives audio signals from a user and converts the audio signals to analog signals for transmission by a transmitter 120. The speaker 116 receives analog signals from a receiver 122 and converts the analog signals to audio signals that may be understood by the user. The communication device 100 may include a separate alerting device 118 or ringer to alert the subscriber of an incoming call and of other operations or conditions of the communication device 100 or the speaker 116 may be used for these purposes. The alerting device 118 may be a small speaker or other acoustic device. The alerting device 118 may be coupled to the control unit 108.

The microphone 114 may be electrically connected to an analog-to-digital converter 124 in the transmitter 120. The analog-to-digital converter 124 changes the analog signals into a digital form such as pulse-code modulation (PCM) or the like. The analog-to-digital converter 124 may be electrically connected to a digital signal processor (DSP) 126 in the transmitter 120. The DSP 126 may contain a speech coder 128 and a channel coder 130. The speech coder 128 characterizes the digital speech information from the analog-to-digital converter 124 by pitch, volume and other parameters and compresses the digital information. The channel coder 130 inserts error detection, error correction and signaling information. The DSP 126 may be connected to a phase modulator and radio frequency (RF) amplifier 132 that are shown as a single block in FIG. 1. The transmitter 120 may be coupled to an antenna assembly 134 that includes a duplexer 136 and an antenna 138.

The duplexer 136 of the antenna assembly 134 may be connected to a receiver/amplifier and demodulator 140 that are shown in FIG. 1 as a single block for purposes of clarity. The receiver/amplifier and demodulator 140 may be electrically connected to a receiver digital signal processor (DSP) 142. The receiver DSP 142 decompresses the digital signal, separates the signaling commands from the speech data and performs error detection and correction. The receiver DSP 142 may be electrically connected to a digital-to-analog converter 144 in the receiver 122 to convert the digital speech data or information into its original analog signals for transmission to the speaker 116.

The communication device 100 may also include a short range transceiver 146, such as a Bluetooth™ type transceiver or the like to send signals or messages to other devices or appliances within range of the transceiver 146 to control their operation or to have the appliance carry out certain functions. The short range transceiver 146 may have a nominal link range of about 10 centimeters to about 10 meters but the range may be extended for some applications to about 100 meters or more by increasing the transmit power. The transceiver 146 may also receive signals from other devices. The communication device 100 may be powered by a battery 150 that may be electrically coupled to the microprocessor 110 to distribute power to other components of the communication device 100.

Figure 2:
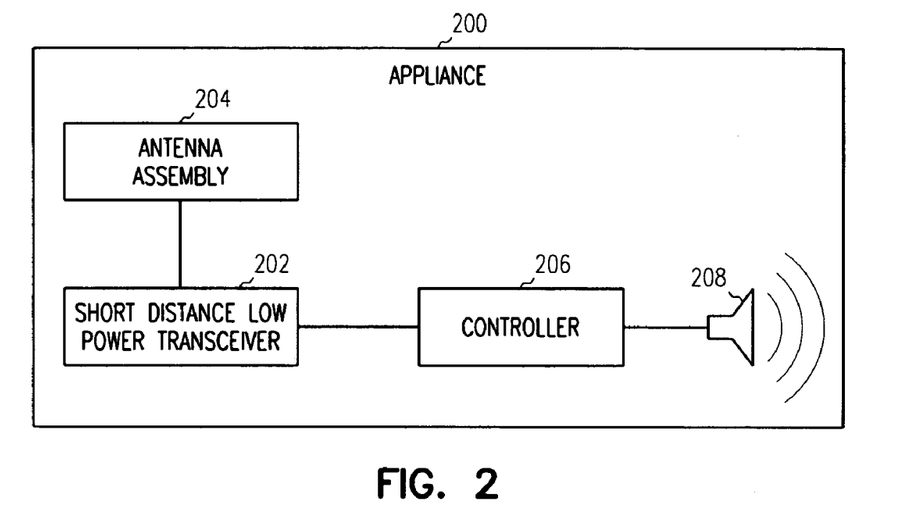
FIG. 2 is a block diagram of an appliance incorporating a short distance, low power transceiver or receiver in accordance with an embodiment of the present invention.

FIG. 2 is a block diagram of an appliance 200 incorporating a short range, low power transceiver 202 in accordance with an embodiment of the present invention. If the appliance 200 is only expected to receive signals and not also transmit signals, a less expensive receiver may be used rather than the transceiver 202. The appliance 200 may be a television, CD player, stereo or similar appliance. The short distance, low power transceiver 202 may be a Bluetooth™ type device or the like, having a range between about 10 centimeters and about 10 meters and an operating power level up to about 100 milliwatts. The short range, low power transceiver 202 may be connected to an antenna assembly 204 to receive signals from communication devices, such as the communication device 100 of FIG. 1 or a similar device. The transceiver 202 may also be connected to a controller 206 to control the operation of the appliance 200 and the controller 206 may be connected to a speaker 208 to control a volume setting of the appliance 200. The controller 206 may be adapted to adjust the volume of the appliance 200 or control the operation of the appliance 200, such as pausing play of a tape, CD, DVD, PVR, personal computer or the like, when the communication device 100 receives an incoming call, initiates an outgoing call or for some other reason a user desires to control operation or volume of the appliance 200 and the communication device's short range transceiver 146 (FIG. 1) is within range of the appliance's transceiver 202 (FIG. 2).

The range of propagation of the communication device's transceiver 146 and the appliance's transceiver 202 may be only a predetermined distance of about 100 feet or less so as to only control an appliance 200 in the immediate vicinity where the communication device 100 may be in use so as to not unintentionally control or effect other appliances at a longer distance, such as in a neighbor's house. The signals transmitted by the communication device's transceiver 146 and received by the appliance's transceiver 202 may be coded or the transceivers 146 and 202 may be selectively set or programmed to operate at a predetermined frequency so as to only control the operation of a selected appliance 200.

Figure 3:
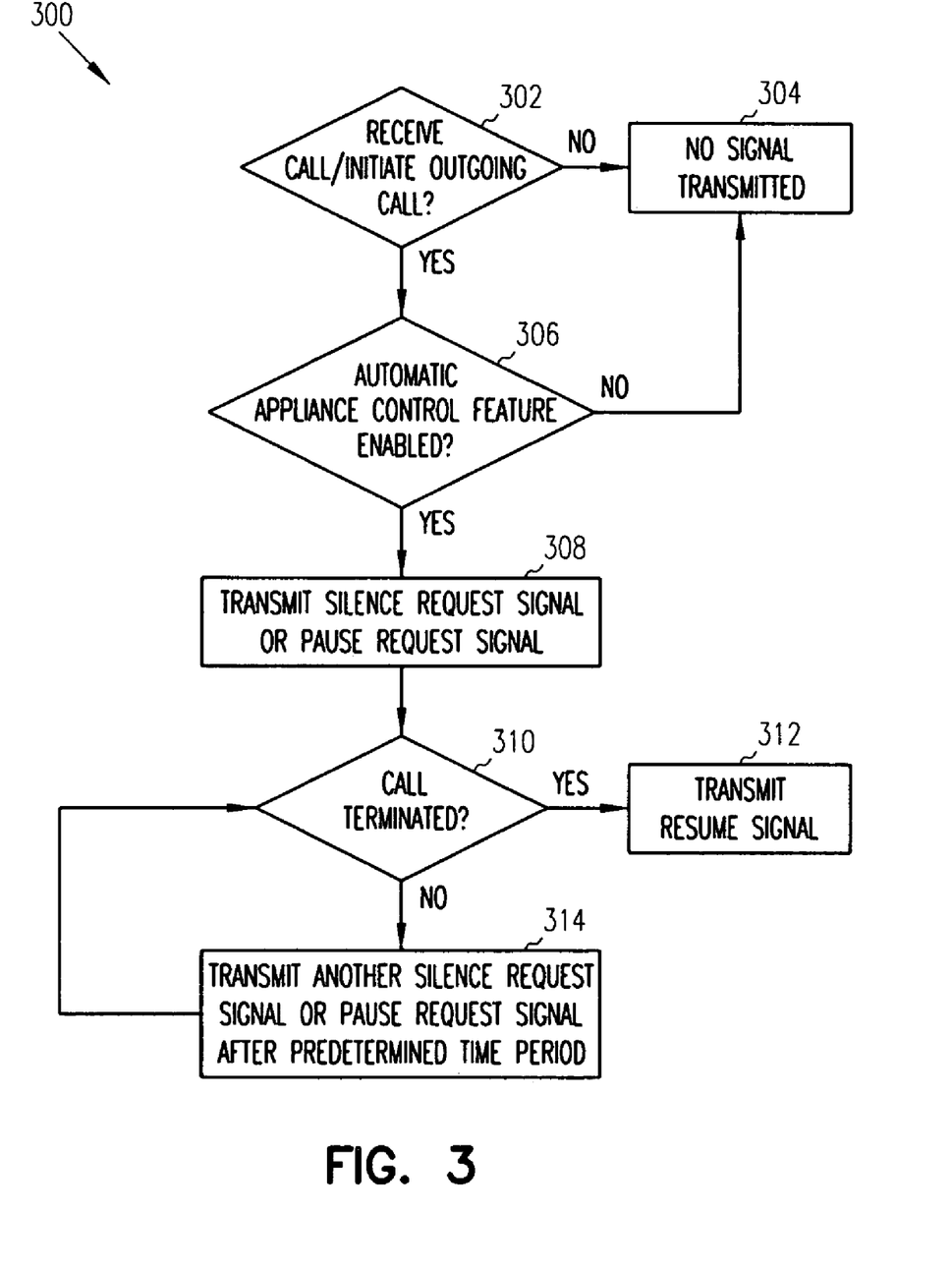
FIG. 3 is a flow chart of a method performed by a communication device to automatically adjust the volume or control operation of an appliance in accordance with an embodiment of the present invention.

FIG. 3 is a flow chart of a method 300 performed by a communications device, such as the communication device 100 in FIG. 1 or the like, to automatically adjust the volume or control operation of an appliance, such as the appliance 200 of FIG. 2 or the like, in accordance with an embodiment of the present invention. In decision block 302, a determination is made if an incoming call is being received or an outgoing call is being initiated by the communication device 100. The microprocessor 110 of the communication device 100 (FIG. 1) may be adapted to detect when an incoming call is being received or an outgoing call is being initiated. If no incoming call is being received or outgoing call initiated, no signal is transmitted by the communication device 100 in block 304. If an incoming call is being received or an outgoing call being initiated, the method 300 advances to decision block 306. In block 306, a determination is made if the communication device 100 has been enabled to transmit a silence request signal, pause request signal or the like, to control the operation or volume of an appliance, such as the appliance 200 of FIG. 2. If the appliance control feature has not been selected in a menu of the communication device 100 by a user, the method 300 advances to block 304 and no signal is transmitted. If the appliance control feature has been selected, the method 300 advances to block 308 and a low power, short range silence request signal, pause request signal or other type control signal may be transmitted by the transmitter 120 of the communication device 100 or if the communication device 100 is equipped with a short range transceiver similar to the transceiver 146 in FIG. 1, the signal may be transmitted by the short range transceiver 146. In decision block 310, a determination is made if the call has been terminated. If yes in block 310, a resume signal is transmitted by the communication device 100 in block 312 to restore the original volume setting in the appliance 200 or to instruct the appliance 200 to continue playing the recording tape, CD, DVD, PVR or the like. If the call has not been terminated in block 310, another silence request signal, pause request signal or other control signal may be transmitted by the transmitter 120 or short range transceiver 146 after a predetermined time period in block 314. If the communication device 100 has not moved out of range from the appliance 200 and the appliance 200 therefore receives the other request signal in block 314, the appliance 200 will continue to mute, maintain a low volume setting or pause operation. The method 300 may be performed by the microprocessor 110 of the communication device 100. The method 300 may be embodied in a computer readable medium having computer-executable instructions for performing the method 300. The computer readable medium may include any kind of computer memory, such as floppy disks, conventional hard disks, compact disc-read only memory (CD-ROM), flash ROMS, nonvolatile ROM, random access memory (RAM) or the like.

Figure 4:
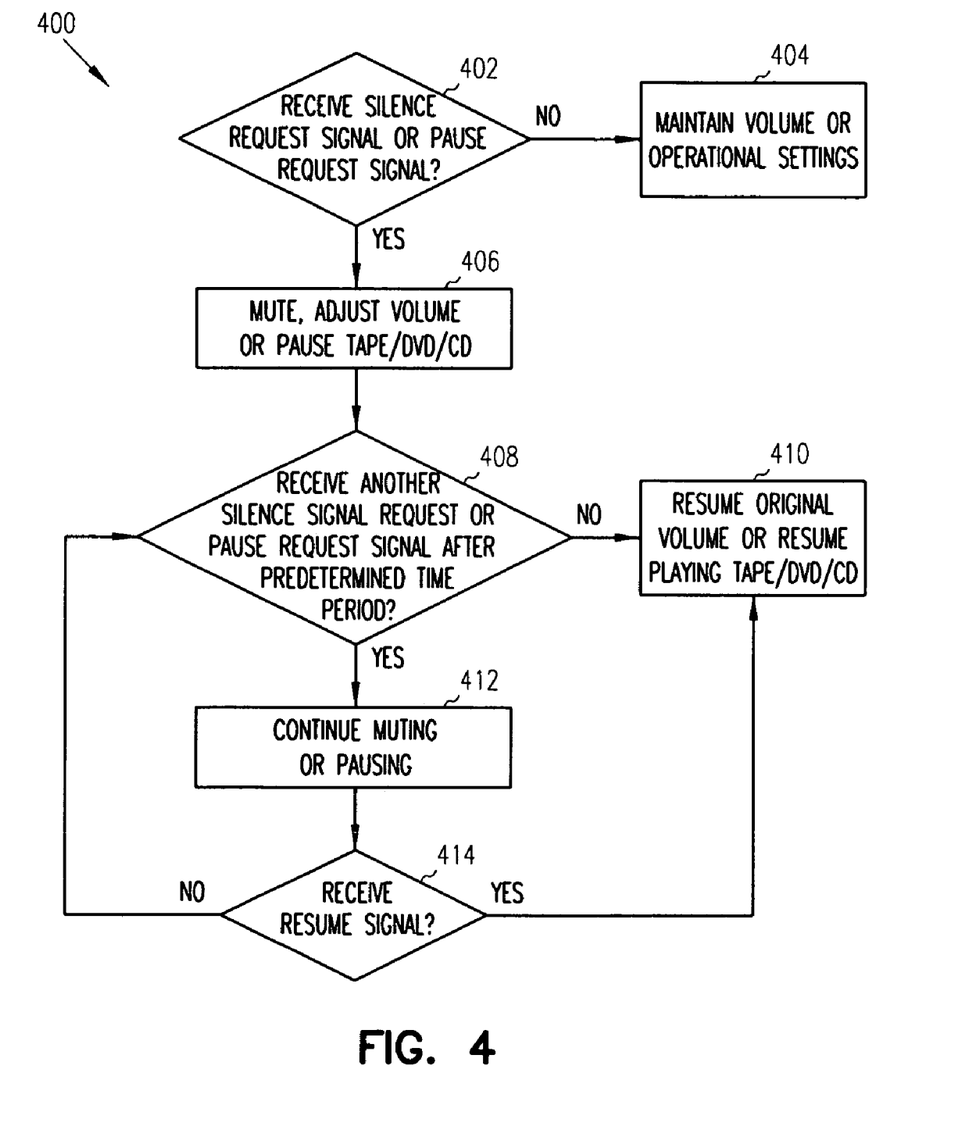
FIG. 4 is a flow chart of a method performed in an appliance to automatically adjust the volume or control operation of the appliance in accordance with an embodiment of the present invention.

FIG. 4 is a flow chart of a method 400 performed in an appliance, such as the appliance 200 of FIG. 2, to automatically adjust the volume or control the operation of the appliance 200 in accordance with an embodiment of the present invention. In decision block 402, a determination is made if a silence request signal, pause request signal or other control signal has been received from a communication device, such as communication device 100 in FIG. 1. If no such request signal has been received, the appliance 200 maintains its current volume or operational settings in block 404. If a silence request or pause request signal is received from the communication device 100, the appliance 200 mutes, lowers the volume setting or pauses operation in block 406. In decision block 408, a determination is made if another request signal has been received within a predetermined time period. If another request signal has not been received, the appliance 200 may resume the original volume setting or resume playing the tape, CD, DVD, PVR or the like in block 410. Accordingly, if the communication device 100 moves out of signaling range from the appliance 200, the appliance 200 will not receive another request signal within the predetermined time period and the appliance 200 may resume the original volume setting or resume play. The communication device 100 may repeatedly send another silence request signal, pause request signal or other signal at predetermined time intervals to cause the appliance 200 to continue muting or pausing play in block 412 until the call is terminated or the communication device 100 moves out of range of the appliance 200. When a call is terminated, the communication device 100 may send a resume signal. In decision block 414, a determination is made if a resume signal has been received from the communication device 100. If a resume signal has been received, the original volume setting or play may resume in block 410. If a resume signal has not been received, the method 400 moves to block 408 where a determination is made if another request signal has been received within the predetermined time period. The method 400 may be performed by the controller 206 of the appliance 200 (FIG. 2) which may be a microprocessor or a separate microprocessor (not shown in the drawings) may be included in the appliance 200 to perform the method 400. The method 400 may be embodied in a computer readable medium having computer-executable instructions for performing the method 400. The computer readable medium may include any kind of computer memory, such as floppy disks, conventional hard disks, compact disc-read only memory (CD-ROM), flash ROMS, nonvolatile ROM, random access memory (RAM) or the like.

Figure 5:
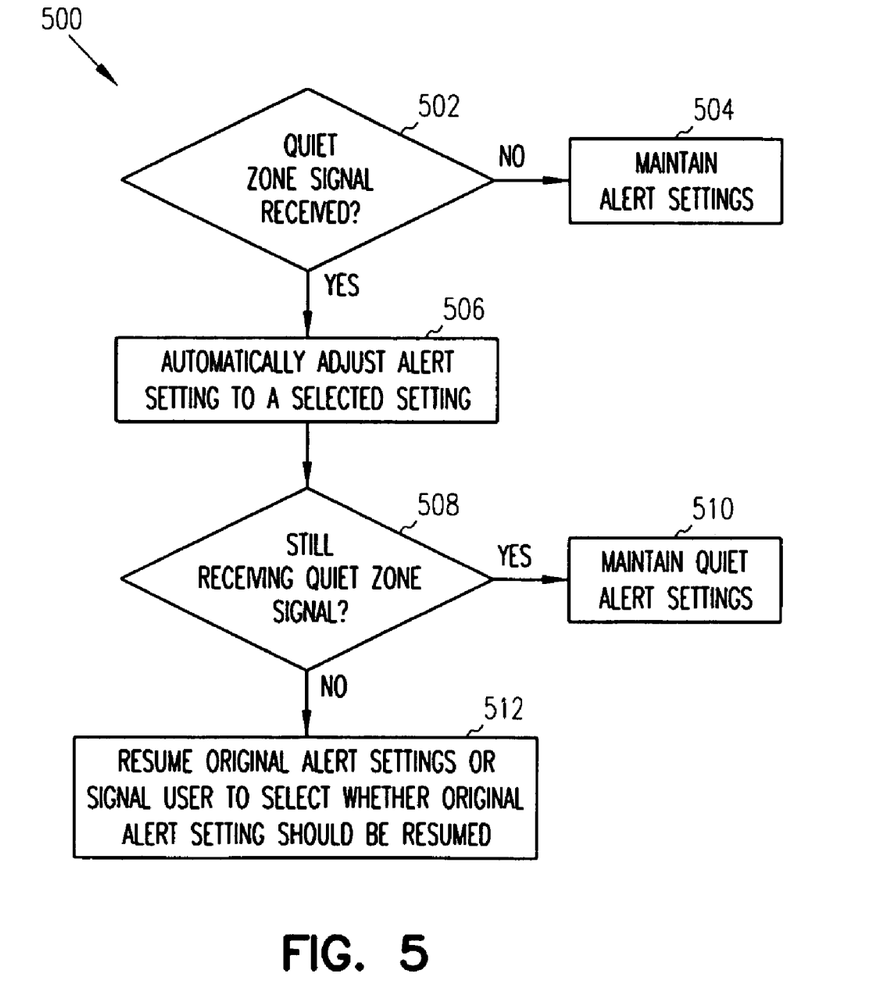
FIG. 5 is a flow chart of a method to automatically adjust the alert settings of a communication device in accordance with an embodiment of the present invention.

FIG. 5 is a flow chart of a method 500 to automatically adjust the alert settings of a communication device, such as the communication device 100 of FIG. 1 or the like, in accordance with an embodiment of the present invention. The method 500 may be performed by the microprocessor 110 of the communication device 100. In decision block 502, a determination may be made whether a quiet zone signal or other chosen signal has been received by the communication device 100. The quiet zone signal may be sent by a short range, low power transmitter or transceiver (not shown in the drawings), such as a Bluetooth™ type device or the like. The transmitter may continuously transmit the quiet zone signal so that when a communication device, such as the communication device 100, incorporating the method 500 of the present invention enters the range of the transmitter, the communication device 100 will receive the quiet zone signal and carry out the method 500.

If a quiet zone signal has not been received, the communication device 100 maintains the current alert settings in block 504. If a quiet zone signal has been received, the communication device 100 may automatically adjust its alert setting to a selected alert setting or to a quiet alert setting in block 506 in response to the quiet zone signal unless the communication device 100 is currently configured with the selected alert setting. Examples of the selected alert setting are muting the ringer or audio alert device similar to the audio alert device 118 of the communication device 100 in FIG. 1, activating a vibration alert or visual alert or activating a combination vibration and visual alert or reducing the ringer volume or volume of the alert device 118 to a predetermined or selected decibel level. In block 508, the communication device 100 may determine if the quiet zone signal is still being received indicating that the communication device 100 may still be within the quiet zone. If the quiet zone signal is still being received by the communication device 100, the communication device 100 maintains the quiet alert settings or selected alert setting in block 510. If the communication device 100 is no longer receiving the quiet zone signal, the communication device 100 may automatically resume the original alert setting or signal the user to select whether the original alert setting should be resumed in block 512.

The method 500 may be embodied in a computer readable medium having computer-executable instructions for performing the method 500. The computer readable medium may include any kind of computer memory, such as floppy disks, conventional hard disks, compact disc-read only memory (CD-ROM), flash ROMS, nonvolatile ROM, random access memory (RAM) or the like.

Figure 6:
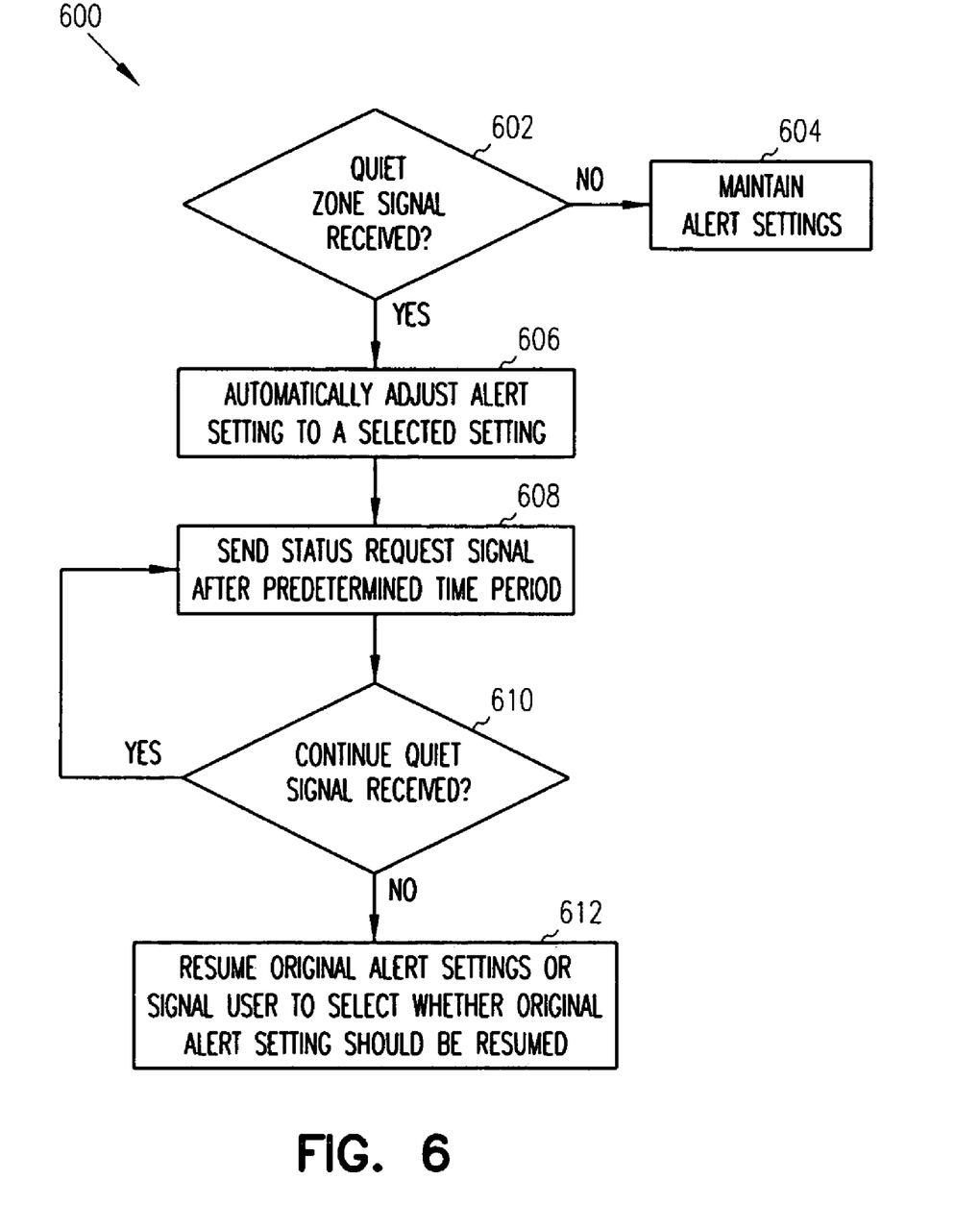
FIG. 6 is a flow chart of a method to automatically adjust the alert settings of a communication device in accordance with another embodiment of the present invention.

FIG. 6 is a flow chart of a method 600 to automatically adjust the alert settings of a communication device, such as the communication device 100 in FIG. 1 or the like, in accordance with another embodiment of the present invention. In decision block 602, the communication device 100 determines if a quiet zone signal has been received. If a quiet zone signal has not been received, the communication device 100 maintains the current alert settings in block 604. If a quiet zone signal has been received, the communication device 100 may automatically adjust the alert setting to a selected setting unless the communication device 100 is currently configured for the selected alert setting. If the quiet zone signal is not being broadcast continuously by the quiet zone, the communication device 100 may transmit a status signal after a predetermined time period in block 608 to determine if the communication device 100 is still within the quiet zone. If a continue quiet signal is received in block 610, the method 600 loops back to block 608 and the communication device 100 sends another status signal after a predetermined time period. If a continue quiet signal is not received in block 610, the communication device 100 may automatically resume the original alert setting or signal the user to select whether the original alert setting should be resumed in block 612.

The method 600 may be embodied in a computer readable medium having computer-executable instructions for performing the method 600. The computer readable medium may include any kind of computer memory, such as floppy disks, conventional hard disks, compact disc-read only memory (CD-ROM), flash ROMS, nonvolatile ROM, random access memory (RAM) or the like.

Figure 7:
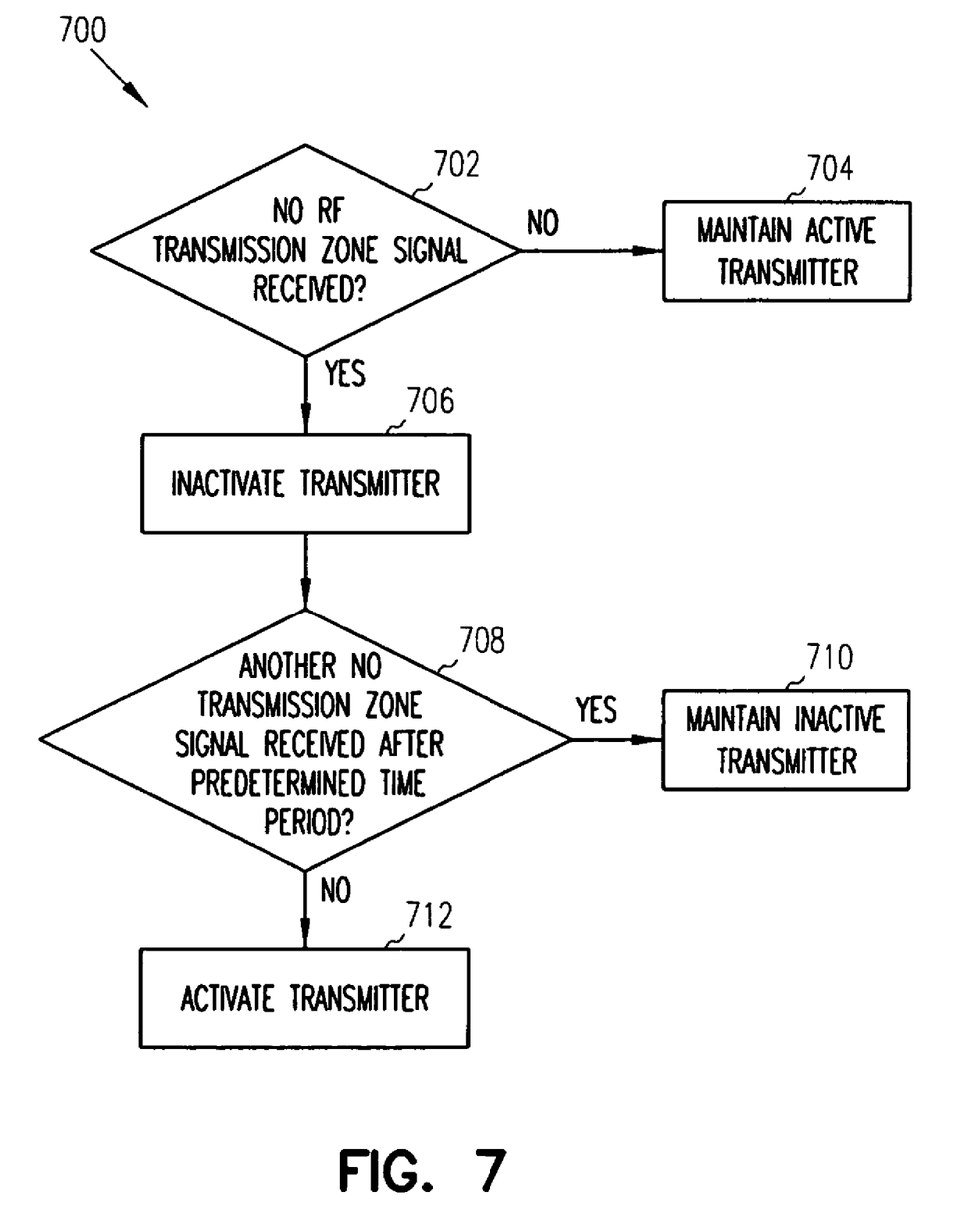
FIG. 7 is a flow chart of a method to automatically control the transmission of radio signals from a communication device in accordance with an embodiment of the present invention.

FIG. 7 is a flow chart of a method 700 to automatically control the transmission of signals from a communication device, such as the communication device 100 of FIG. 1 or the like, in accordance with an embodiment of the present invention. In decision block 702 a determination is made if the communication device 100 has received a "no radio transmission zone" signal indicating that the communication device 100 has entered a zone where radio frequency (RF) signals should not be transmitted. Examples of such "no radio transmission zones" are an airplane preparing to leave a gate area, a zone of a hospital where transmitting radio signals could adversely effect hospital equipment and a construction zone where explosives may be detonated by transmitting radio signals. If a "no radio transmission zone" signal has not been received, the transmitter 120 of the communication device 100 (FIG. 1) may remain active in block 704. If a "no radio transmission zone" signal has been received, the transmitter 120 may be inactivated by the microprocessor 110 (FIG. 1) to prevent radio signals from being transmitted by the communication device 100; however, the receiver 122 (FIG. 1) may remain active. In decision block 708, the communication device 100 determines if another "no radio transmission zone" signal has been received or in an alternate embodiment the "no radio transmission zone" signal may be continuously broadcast and the communication device 100 may determine if the signal is still being received. If another "no radio transmission zone" signal is received or if the continuous signal is still being received, the transmitter 120 will remain inactive in block 710. If another "no radio transmission zone" signal is not received within a predetermined time period or a continuos "no radio transmission zone" signal is no longer being received by the communication device 100, the transmitter 120 may be activated by the microprocessor 110 (FIG. 1) in block 712.

The method 700 may be embodied in a computer readable medium having computer-executable instructions for performing the method 700. The computer readable medium may include any kind of computer memory, such as floppy disks, conventional hard disks, compact disc-read only memory (CD-ROM), flash ROMS, nonvolatile ROM, random access memory (RAM) or the like.

Although specific embodiments have been illustrated and described herein, those of ordinary skill in the art appreciate that any arrangement which is calculated to achieve the same purpose may be substituted for the specific embodiments shown. This application is intended to cover any adaptations or variations of the present invention. Therefore, this invention is limited only by the claims and the equivalents thereof.

What is claimed is:

1. An apparatus, comprising:
  a device adapted to detect one of receiving an incoming call and initiating an outgoing call; and
  a transmitter adapted to send a request signal in response to one of receiving the incoming call and initiating the outgoing call to cause adjustment of a volume setting of an appliance to be at a selected volume or to control operation of the appliance, wherein the transmitter is further adapted to transmit at least one additional request signal after the response to one of the incoming call and the outgoing call to continue to maintain the selected volume or to continue to control the operation of the appliance.

2. The apparatus of claim 1, wherein the device is a microprocessor.

3. The apparatus of claim 1, wherein the device is a radio telephone.

4. The apparatus of claim 1, wherein the transmitter has a range between about 10 centimeters and about 10 meters.

5. The apparatus of claim 1, wherein the transmitter is a transmitter of a communication device and the request signal is transmitted at a selected power to propagate only a predetermined distance to the appliance.

6. The apparatus of claim 1, wherein the transmitter is adapted to automatically transmit the additional request signal after a predetermined time period in response to the one of the incoming call and the outgoing call.

7. The apparatus of claim 1, wherein the transmitter is adapted to transmit a resume signal after the incoming call or outgoing call is terminated.

8. The apparatus of claim 7, further comprising a receiver associated with the appliance to receive the request signal and the resume signal.

9. A communication device, comprising:
  a transmitter adapted to send radio signals;
  a receiver adapted to receive radio signals;
  a transceiver adapted to send a request signal in response to the communication device receiving an incoming call and initiating an outgoing call to adjust a volume setting or pause operation of an appliance;
  a controller adapted to control operation of the transmitter, the receiver and the transceiver; and
  the transceiver is adapted to repeatedly transmit another request signal at predetermined time intervals until the incoming call or outgoing call is terminated.

10. The communication device of claim 9, wherein the transceiver is adapted to transmit a resume signal after the incoming call or outgoing call is terminated.

11. The communication device of claim 9, wherein the controller is adapted to adjust an alert setting of the communication device to a selected setting in response to the communication device receiving a chosen signal.

12. The communication device of claim 11, wherein the controller is adapted to resume an original alert setting in response to an expiration of a predetermined time period and not receiving another chosen signal.

13. The communication device of claim 11, wherein the controller is adapted to maintain the selected setting in response to receiving another chosen signal within a predetermined time period.

14. A method, comprising:
  determining at least one of receiving an incoming call and initiating an outgoing call;
  transmitting a request signal;
  adjusting a volume setting of an appliance to a selected setting or pausing operation of the appliance in response to the request signal; and
  transmitting at least one additional request signal after the determining one of the receiving the incoming call and the outgoing call to continue to maintain the selected setting or the pausing operation of the appliance.

15. The method of claim 14, further comprising resuming an original volume setting or continuing operation after termination of the incoming call or the outgoing call.

16. The method of claim 15, wherein resuming the original volume setting or continuing operation comprises transmitting a resume signal after termination of the incoming or outgoing call.

17. The method of claim 14, wherein the additional request signal is transmitted within a predetermined time period.

18. The method of claim 14, further comprising resuming the original volume setting or continuing operation after a predetermined time period if the additional request signal is not received.

19. The method of claim 14, wherein the request signal is transmitted by one of a transmitter of a communication device operating at a selected power or another transmitter separate from the transmitter of the communication device.

20. A computer-readable medium encoded with computer-executable instructions for performing a method comprising:
   determining at least one of receiving an incoming call and initiating an outgoing call;
   transmitting a request signal;
   adjusting a volume setting of an appliance to a selected setting or pausing operation of the appliance in response to the request signal; and
   transmitting at least one additional request signal after the determining one of the receiving the incoming call and the outgoing call to continue to maintain the selected setting or the pausing operation of the appliance.

21. The computer-readable medium encoded with computer-executable instructions for performing the method of claim 20, wherein the additional request signal is transmitted within the predetermined time period.

22. The computer-readable medium encoded with computer-executable instructions for performing the method of claim 20, further comprising resuming the original volume setting or continuing operation after a predetermined time period if the additional request signal is not received.

23. The computer-readable medium encoded with computer-executable instructions for performing the method of claim 20, further comprising resuming an original volume setting or continuing operation after termination of the incoming call or the outgoing call.

24. The computer-readable medium encoded with computer-executable instructions for performing the method of claim 23, wherein resuming the original volume setting or continuing operation comprises transmitting a resume signal after termination of the incoming or outgoing call.

* * * * *